Aug. 23, 1949.                    R. F. MAXFIELD                    2,479,689
                        FINISHING MACHINE FOR MOLDED PIECES
Filed Feb. 2, 1946                                            5 Sheets-Sheet 1
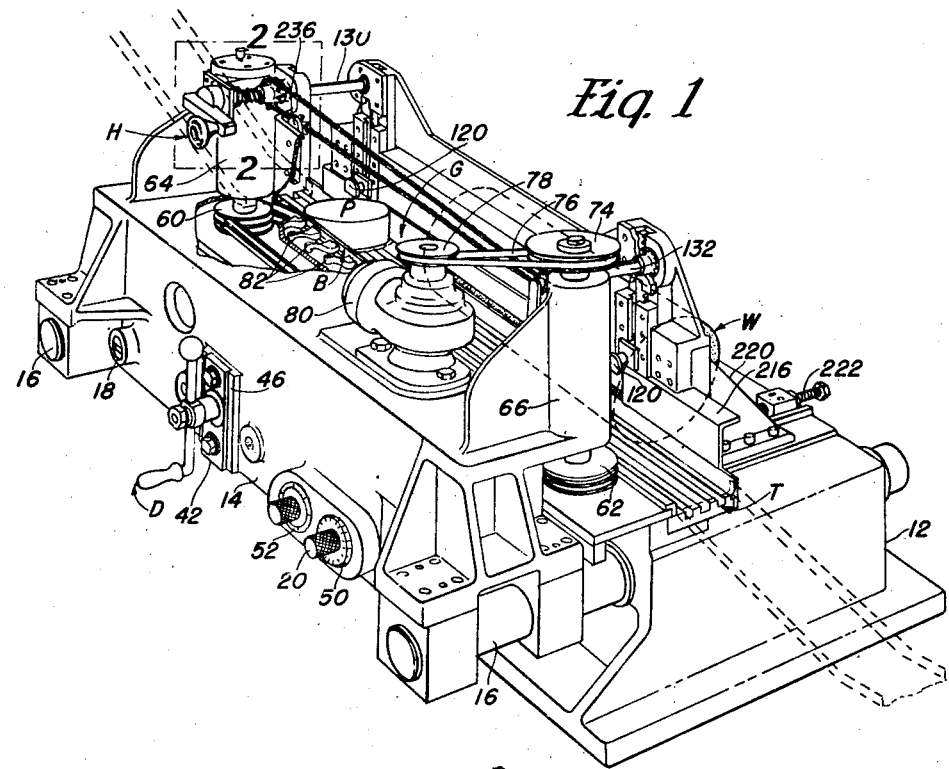
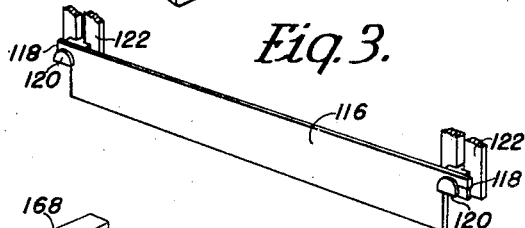
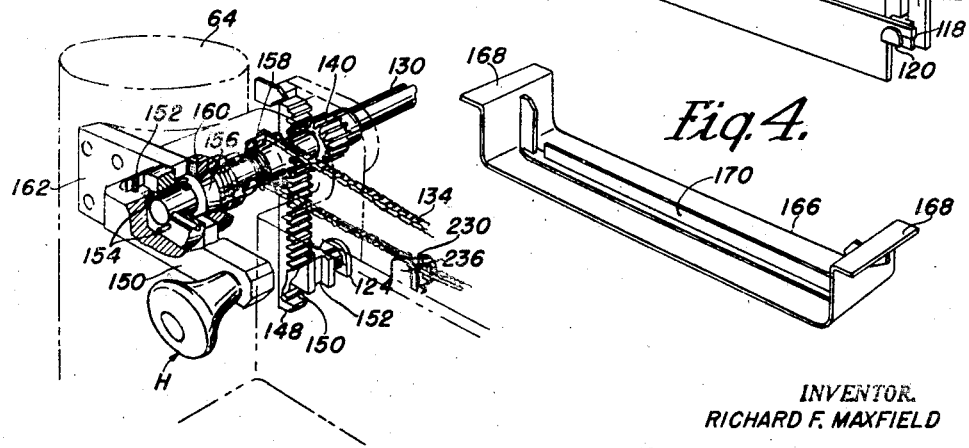
INVENTOR.
RICHARD F. MAXFIELD
BY
*James and Franklin*

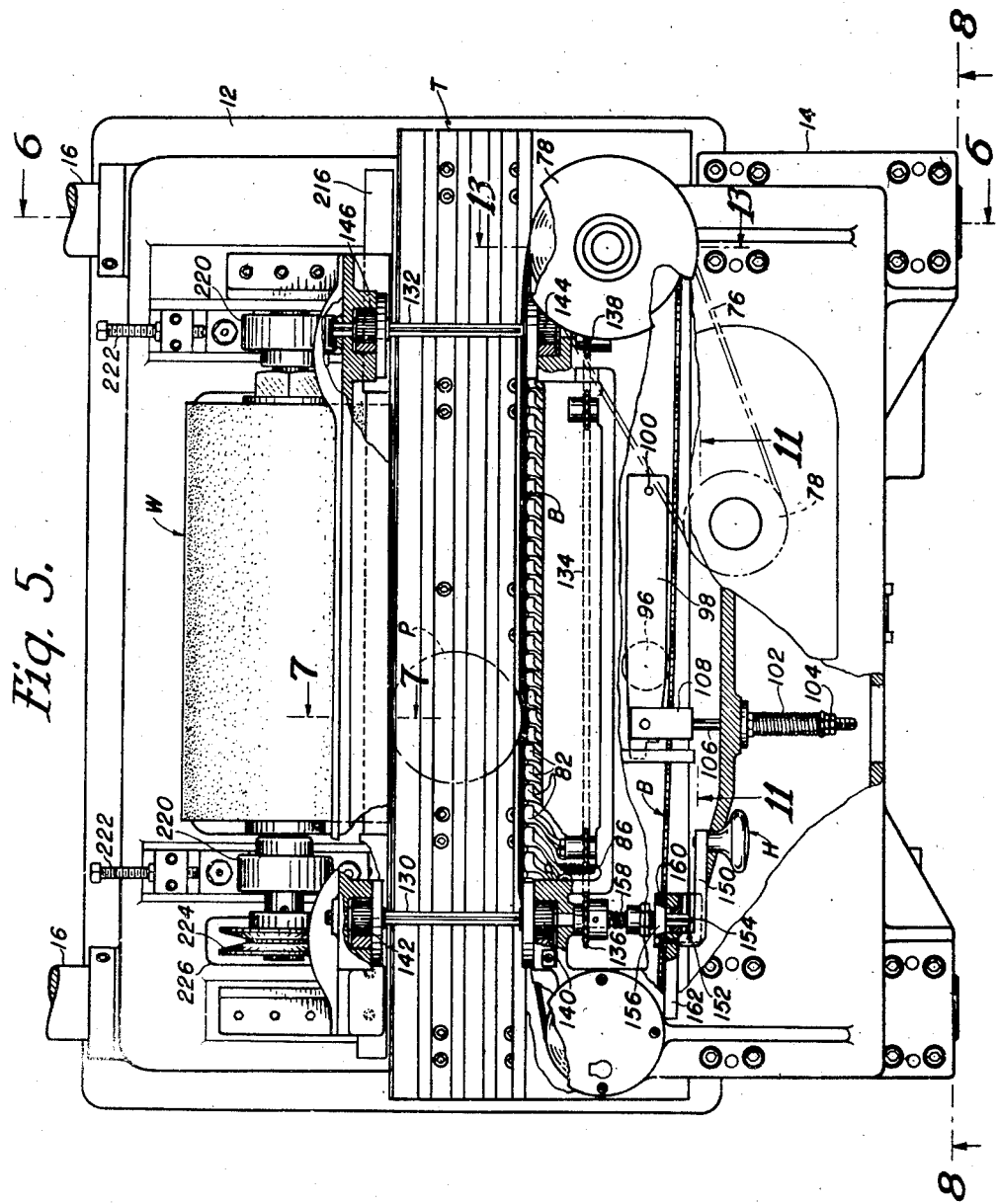

Aug. 23, 1949.  R. F. MAXFIELD  2,479,689
FINISHING MACHINE FOR MOLDED PIECES
Filed Feb. 2, 1946  5 Sheets-Sheet 3
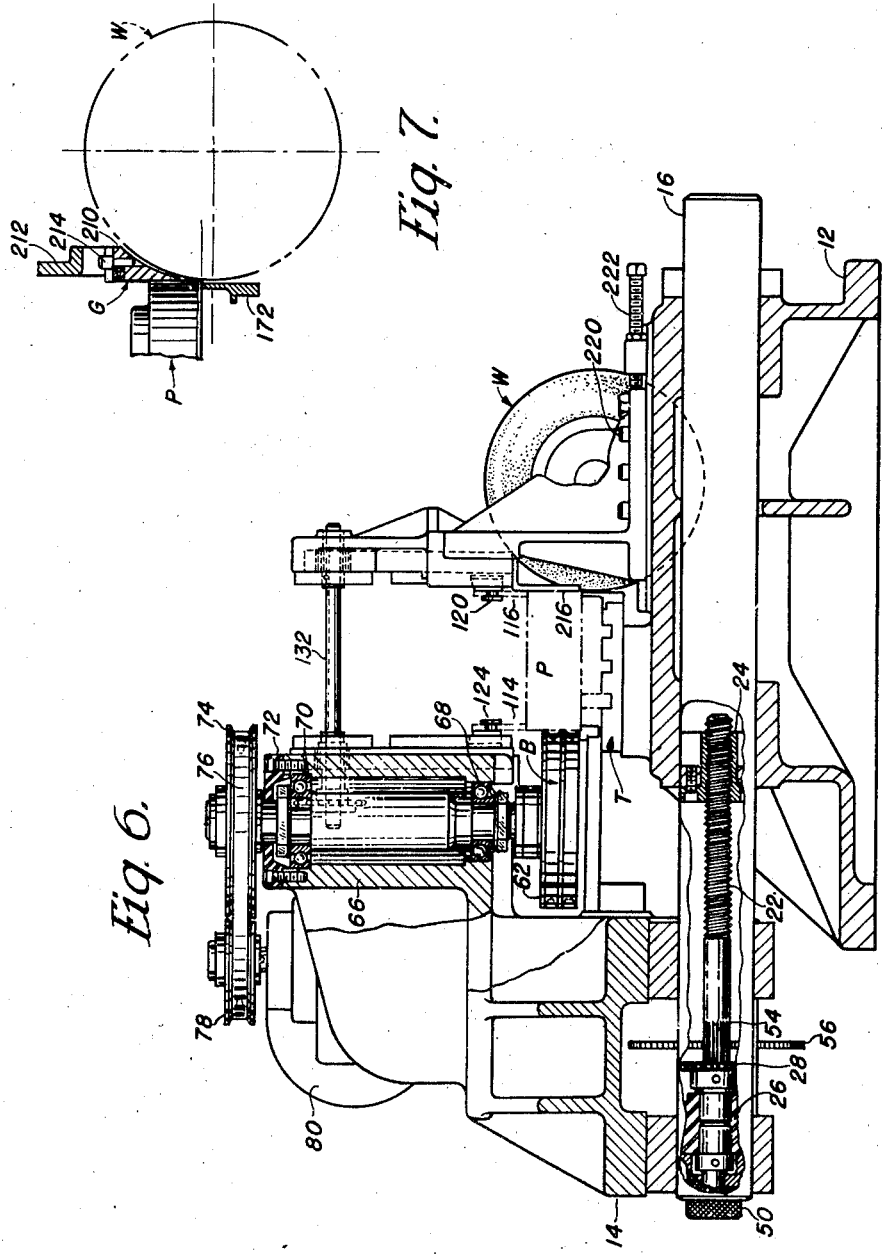
INVENTOR.
RICHARD F. MAXFIELD
BY
*James and Franklin*

Aug. 23, 1949.  R. F. MAXFIELD  2,479,689
FINISHING MACHINE FOR MOLDED PIECES
Filed Feb. 2, 1946  5 Sheets-Sheet 4
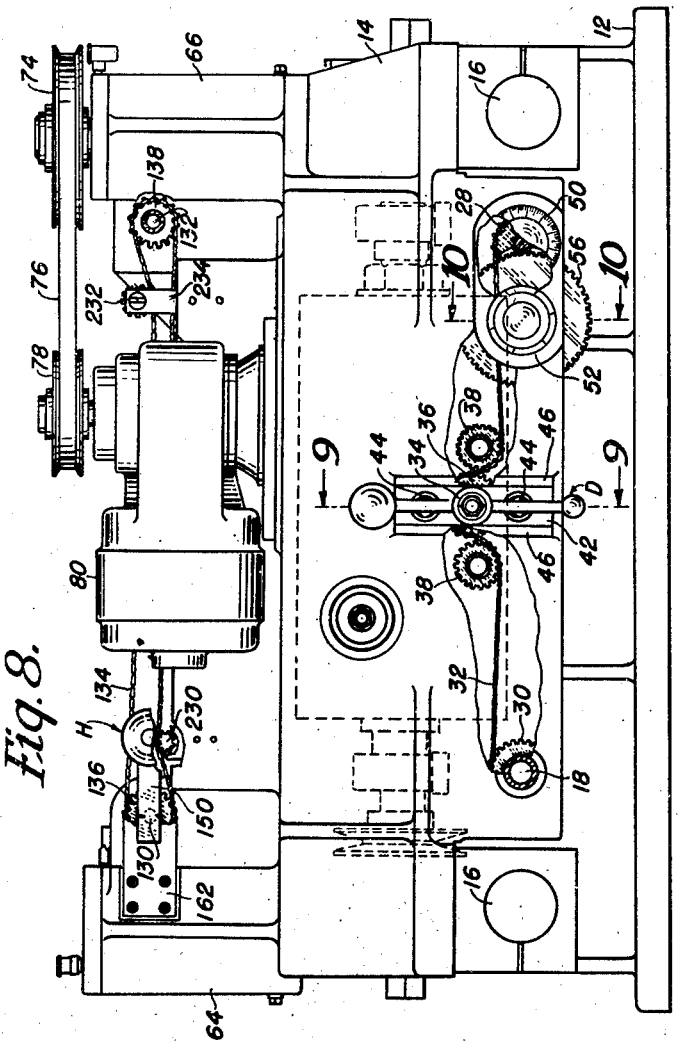
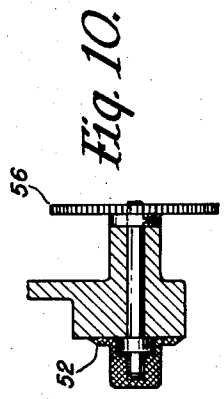
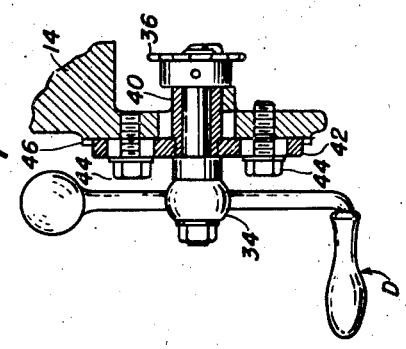
INVENTOR.
RICHARD F. MAXFIELD
BY *James and Franklin*

Aug. 23, 1949.    R. F. MAXFIELD    2,479,689
FINISHING MACHINE FOR MOLDED PIECES
Filed Feb. 2, 1946    5 Sheets-Sheet 5
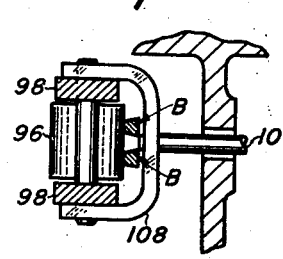
Fig.12.
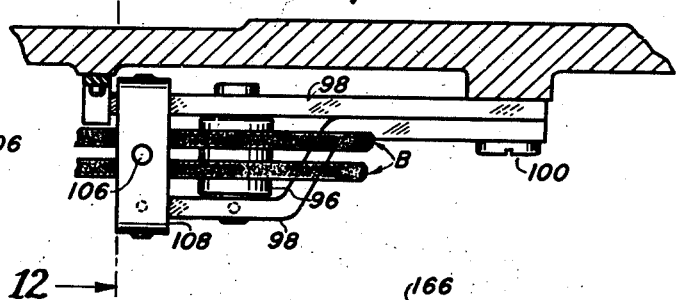
Fig.11.
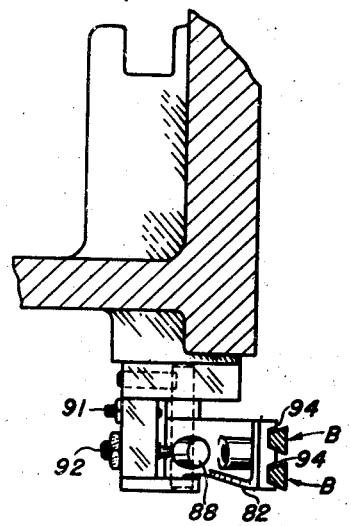
Fig.13.
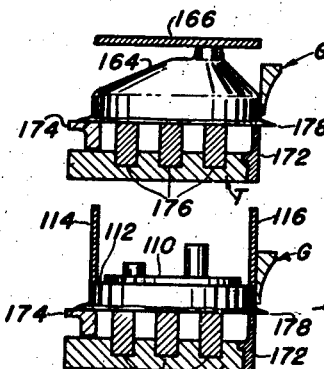
Fig.14.
Fig.15.
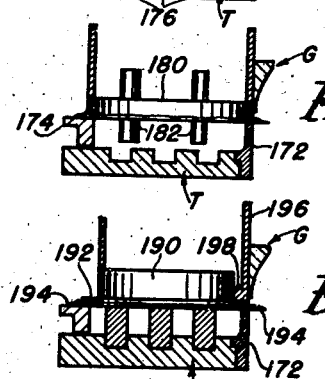
Fig.16.
Fig.17.
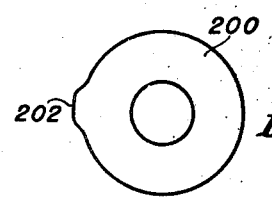
Fig.18.
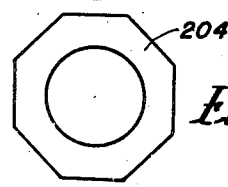
Fig.19.
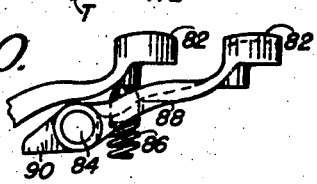
Fig.20.
INVENTOR.
RICHARD F. MAXFIELD
BY *James and Franklin*

Patented Aug. 23, 1949

2,479,689

UNITED STATES PATENT OFFICE 2,479,689

FINISHING MACHINE FOR MOLDED PIECES

Richard F. Maxfield, Mountain Lakes, N. J., assignor to Boonton Molding Company, Boonton, N. J., a corporation of New Jersey Application February 2, 1946, Serial No. 645,050

31 Claims. (Cl. 51—74)

This invention relates to finishing machines, and more particularly to machines for removing fin or flash from molded pieces.

Heretofore, fin or flash has been removed from molded pieces by tumbling, or by hand-holding the pieces against a grinding wheel, or by securing the pieces one after another in the chuck of a polishing lathe and holding a file or moving a cutting tool against the fin.

The primary object of the present invention is to generally improve the finishing of molded pieces, especially circular or approximately circular pieces in which the parting face of the mold or die is perpendicular to the axis of the piece. A more particular object of the invention is to provide apparatus for automatically grinding the fin or flash from circular molded pieces.

The invention is described as applied to plastics, but is also applicable to die castings. It is not too difficult to design an automatic machine for the present purpose for handling a single item. However, a custom molder works for the most part with small job lots which may be run through an automatic machine in a very short time, sometimes in as little as, say, ten minutes. If considerably more time is needed to adjust and set up the machine to handle a particular piece, it would not be economical to use an automatic machine for the purpose, and it would prove cheaper to continue using a semi-manual procedure. Many objects and features of the invention, therefore, center about numerous provisions made to quickly adapt the machine to handle a variety of kinds and size of molded piece. More specifically, one object of the invention is to so roll the molded piece along a grinding wheel by means of a belt that the peripheral speed is constant regardless of the diameter of the piece. Thus the rate of presentation of fin to be ground is substantially constant. Still another object is to facilitate adjustment of the machine to changes in diameter of the piece being finished. Still another object is to readily and rapidly accommodate changes in height of the piece being finished. A still further object of the invention is to make it possible to take care of molded pieces having inserts or projections at the top, or bottom, or both. Another object of the invention is to make it possible to take care of molded pieces having a thin flange at the parting face, so as not to grind away the flange as though it were a fin.

To fulfill the foregoing general objects, and other more specific objects which will hereinafter appear, my invention resides in the apparatus elements and their relation one to the other, as hereinafter more particularly described and sought to be claimed in the following specification. The specification is accompanied by drawings, in which:

Fig. 1 is a perspective view of an apparatus embodying features of my invention;

Fig. 2 is a phantom view explanatory of a detail of the mechanism for adjusting for change in height of the molded piece;

Fig. 3 is a perspective view of a shoe used in the machine;

Fig. 4 is a perspective view of a modified form of shoe;

Fig. 5 is a plan view of the machine with parts cut away;

Fig. 6 is a section taken approximately in the plane of the line 6—6 of Fig. 5;

Fig. 7 is a section taken approximately in the plane of the line 7—7 of Fig. 5;

Fig. 8 is a front elevation of the machine with portions cut away;

Fig. 9 is a section taken approximately in the plane of the line 9—9 of Fig. 8;

Fig. 10 is a section taken approximately in the plane of the line 10—10 of Fig. 8;

Fig. 11 is a section taken approximately in the plane of the line 11—11 of Fig. 5;

Fig. 12 is a section taken approximately in the plane of the line 12—12 of Fig. 11;

Fig. 13 is a partially sectioned view explanatory of certain pressure fingers forming a part of the invention;

Fig. 14 is a section showing how a flat top shoe is used with certain molded pieces;

Fig. 15 is a section showing how spaced shoes are employed edgewise;

Fig. 16 is a section showing how intermediate rails may be removed from the table when the molded piece has both top and bottom projections;

Fig. 17 shows how a specially made shoe may be used as a spacer when the molded piece has a very thin flange within the fin to be removed;

Figs. 18 and 19 illustrate molded pieces which may be handled by the machine, even though not truly circular; and Fig. 20 shows a detail.

Referring to the drawing, and more particularly to Figs. 1, 5, 6 and 7, the molded piece P is rolled along a relatively long cylindrical grinding wheel W. There is a table T extending longitudinally of the wheel, and one or more belts B above the table and spaced from the wheel by an amount approximately equal to the diameter of the piece P. The belt is moved by a motor and pulleys, and rolls the piece P along the grinding wheel, thereby presenting to the wheel the fin around the bottom edge of the piece. As is best shown in Figs. 1 and 7, a guide G is placed closely adjacent the wheel, and above the table, with clearance therebetween to pass the fin or flash to the wheel.

Appropriate adjustments are provided to readily and rapidly accommodate changes in the diameter and height of the piece. Thus, in Fig. 1, the handle D varies the spacing of the belt B from the guide G, and so takes care of changes in diameter. The handle H varies the height of one or more guide shoes (not shown in Fig. 1 but separately shown in Figs. 3 and 4) which rest gravitationally on the piece, and so takes care of changes in height. Other changes and adjustments may be made, as are described later in this specification.

Considering the machine in greater detail, it comprises a stationary base or foundation 12, on which a head 14 is mounted, said head being carried on two widely spaced tubular pillars 16 which are slidable in base 12. The head 14 carries the belt B, together with its associated pulleys and driving motor, and thus facilitates adjustment for change in diameter of the molded pieces. The head 14 is moved by spaced screws, the ends of which are seen at 18 and 20 in Fig. 1, and the latter of which is best shown in Fig. 6. In that figure it will be seen that screw 22 is threadedly received in a bushing 24 acting as a stationary nut bolted to the base 12. The screw is rotatable in a suitable bearing 26, but is held against axial movement in the bearing, so that rotation of the screw causes the entire head 14 to move. Normally the head is locked because the screw action is irreversible.

The two screws are geared together for movement in unison. For this purpose, screw 22 carries a sprocket wheel 28. Referring now to Fig. 8, sprocket wheel 28 is operatively connected to a similar sprocket wheel 30 by means of a chain 32. The chain is moved by a crank handle D, the hub 34 of which turns a sprocket wheel 36. Chain 32 is held closely around sprocket wheel 36 by idlers 38.

Slack in chain 32 may be taken up by vertically shifting the crank D and sprocket 36. For this purpose, the parts are mounted in a bearing 40 (see Fig. 9) carried by a vertically slotted bearing plate 42. This is bolted to the head 14 by bolts 44. The bearing plate is preferably guided between ways 46 (Fig. 1, 8, and 9).

The adjustment for change in diameter of the molded piece is preferably aided by appropriate indicator dials. In the present case, screw 22 carries an indicator dial 50 at its outer end, as is best shown in Figs. 1, 6, and 8. There is also a "tens" dial 52 alongside the dial 50. The dials are connected by appropriate reduction gearing, including pinion teeth 54 (see Fig. 6) on screw 22, meshing with a gear 56, clearly shown in Figs. 6, 8, and 10.

The belt B (Fig. 1) consists in the present case of two V-belts carried on pulleys 60 and 62. These are mounted on the lower ends of vertical shafts carried in bearing housings 64 and 66, cast integrally with the head 14. The bearing assembly is best shown in Fig. 6, which illustrates how ball bearings 68 and 70 are inserted from above and surmounted by a bearing cap 72. Pulleys 62, shown in Fig. 6, are the driving pulleys, and the shaft projects above bearing housing 66 to carry a pulley 74, joined by a V-belt 76 to a pulley 78, driven by a motor 80 through appropriate reduction gearing. The pulleys 74 and 78 preferably constitute a variable speed drive, this being of the type in which the spacing apart of the sides of the sheaves of the pulleys may be varied, the spacing of one being increased, while that of the other is decreased. However, this adjustment is needed only rarely, and is usually made such that the speed of movement of the molded piece along the grinding wheel will take care of even a heavy fin.

In order to maintain uniform pressure between the moving belt and the molded piece being finished, the belt is preferably backed up by a closely spaced series of spring-pressed fingers. These are indicated at 82, in Figs. 1 and 5, and are shown in greater detail in Figs. 13 and 20. The fingers 82 are pivoted at 84, and are spring-pressed toward the belt by compression springs 86. Because of the close spacing of the fingers, the spring 86 for one finger passes through a hole 88 in the next finger. An extension 90 on the opposite side of pivot 84 acts as a stop to limit the movement of the finger, under pressure of the spring. This movement may be adjusted by means of stop screws 91 (Fig. 13). The end of each finger is recessed, as best shown at 94 in Fig. 13, to receive the belts B. These ends are smooth and rounded so as to minimize friction as the belt runs over the same. The pressure of each spring may be adjusted by a screw 92. Thus increased pressure may be provided where desired, or for example at the start of the grind.

Reverting to Fig. 5, the fingers form the belt into a straight line, except at the point where the belt engages the molded piece P. At this point, the belt yields outward a bit, and in practice there is, in effect, a ripple moving along the belt with the molded piece.

The fingers are not used to take up slack of the belt, but instead to maintain uniform pressure on the molded piece at all times, even at a point half-way between the pulleys, where normally the pressure would be least and perhaps inadequate. A special idler is provided to take up slack, and this is shown at 96, the idler being carried on an arm 98, pivoted at 100, and normally urged outwardly against the inside of the belt by a compression spring 102 bearing against adjusting nuts 104, on a rod 106 passing through the spring, the inner end of rod 106 being connected to arm 98 by a yoke 108. These parts are shown in greater detail in Figs. 11 and 12, wherein idler 96 turns freely between the spaced apart branches of arm 98, the latter being connected to spring-pressed rod 106 by a yoke 108.

It will be understood that the belt B, its pulleys, driving motor, spring-pressed fingers, and slack take-up idler are all mounted on the head 14 and moved bodily with the head when an adjustment for change in diameter is made.

To help hold the molded piece down on the table as it is being rolled along the grinding wheel, I provide one or more shoes which rest gravitationally on the molded pieces as they move through the machine. Referring to Fig. 15, the molded piece 110 has a peripheral ledge or land 112, on which spaced shoes 114 and 116 rest edgewise. Referring now to Fig. 3, the shoe 116 has ears 118 received over hangers 120. The hangers are vertically adjustable in ways 122, and by setting them slightly lower than their position when shoe 116 just reaches the molded piece, the weight of the shoe will bear gravitationally on the molded piece. In Fig. 1, the hangers 120 may be seen, but the shoe has been removed. In Fig. 6 the shoes are drawn in dotted lines, and one of the forward hangers 124 is also shown.

The four hangers are simultaneously adjusted for change in height by the following mechanism. Referring to Figs. 5 and 8, handle H turns a shaft 130, which is coupled to another shaft 132 by means of a chain 134 and sprocket wheels 136 and 138. Shaft 130 drives pinions 140 and 142 (Fig. 5), while shaft 132 drives pinions 144 and 146. These pinions mesh with vertically movable racks, one of which is best shown in Fig. 2. Each rack 148 has fixed therein a sidewardly projecting pin 150, said pin coming under the slide 152 of the hanger. With this arrangement rotation of the crank H raises or lowers all four hangers.

To permit movement of the head for changes in diameter of the molded piece, the shafts 130 and 132 are splined or provided with a long keyway which is slidable through the rear pinions 142 and 146. The shafts move axially with the head and are long enough to accommodate the range of diameter for which the machine is designed. This arrangement has the further advantage that the forward hangers 124 move with the belts, and thus move the shoe 114 (Fig. 15) relative to the shoe 116, whenever the diameter of the molded piece is changed.

The vertical adjustment of the hangers is normally locked by a friction brake, which is automatically released when the handle H is pushed inwardly to operate the same. Referring to Figs. 2 and 5, the arm 150 is pivoted at 152, and when pressed inwardly bears against a pair of diametrically-spaced pins 154, which move axially against a conical brake member 156. This brake member is normally urged outwardly by a compression spring 158, thus holding the shaft 130 against rotation. The conical brake plug 156 is slidably keyed to the shaft 130. When it is urged outwardly by spring 158, it engages a mating conical brake member 160, which is non-rotatively secured to the bracket 162. To operate the handle H, it is first pushed inwardly, thereby releasing the brake, and is then rotated while bearing inwardly, thus simultaneously raising or lowering all four hangers. It is desirable to initially level the hangers controlled by shaft 132 relative to those controlled by shaft 130. Of course a crude adjustment may be provided by shifting sprocket teeth, but for a fine adjustment smaller in amount than the pitch of the teeth, and at the same time to take up slack in the chain 134 connecting the shafts, I provide means best shown in Fig. 8. The slack is taken up by a first idler 230, positioned beneath the chain, and a second idler 232, positioned above the chain. These idlers are carried on arms which are vertically adjustable, the right-hand arm being shown at 234 in Fig. 8, and the left-hand arm being shown at 236 in Figs. 1 and 2. The arms are slotted to afford limited vertical movement. If slack is taken up by moving idler 230 upwardly and idler 232 downwardly by equal amounts, the relative rotative position of the shafts 130 and 132 is not changed. However, by moving both idlers upwardly or both downwardly, the relative rotative position of the shafts is changed a small amount.

Referring now to Fig. 14, the molded piece 164 there shown has no ledge or land on which the shoes 114 and 116 may rest. In such case, a single wide, flat shoe 166 may be employed. The construction of the shoe is best shown in Fig. 4, in which it will be seen that the flat shoe is bent upwardly at its ends to form flanges 168, adapted to rest over the hangers 120 and 124, previously referred to. The shoe 166 is preferably stiffened by an appropriate rib or angle iron 170. It will be understood that to change from the narrow shoes to the wide shoe, it is merely necessary to lift the narrow shoes upwardly from the hangers and to then drop the wide shoe into place. It may be pointed out that shoes are provided of different widths, in increments of about ¼″. This increment is determined by the axial length of the hangers, because after the hangers are pulled apart far enough to no longer support one wide shoe, the next greater width must be used. It is for this reason that the narrow shoes shown in Fig. 15 are ordinarily employed.

In Figs. 14 and 15, the molded piece has a relatively flat bottom resting on a stationary rail 172, a movable rail 174 and intermediate rails 176. The molded pieces have a relatively flat bottom, with the fin or flash 178 located at the bottom (the piece being inverted, of course, if it has a flat top, with the fin at the top). The intermediate rails 176 are made readily removable from channels in table T. The reason for this is shown in Fig. 16, in which the molded piece 180 has projections or inserts 182 at the bottom. In this case, the intermediate rails are removed, the piece resting solely on the stationary rail 172 and the adjustable rail 174. This is necessary because the projections 182 are offset from the center of the piece and revolve as the piece is rolled along the grinding wheel. If the molded piece has a projection at the center only, it would be necessary to remove only the center rail.

In speaking of the rail 174 as being adjustable, it will be understood that this rail is carried by the movable head, and so changes position whenever the belts are moved to accommodate a change in diameter of the molded piece.

A remaining problem which may arise in rare instances is a molded piece having a flange so thin as to pass beneath the guide G. This is illustrated in Fig. 17, in which the molded piece 190 has a desired step or flange 192, in addition to the undesired fin or flash 194, and in which the flange 192 is so thin that it will pass through the narrow gap or clearance provided between the stationary rail 172 and the lower edge of guide G. If such a molded piece is to be made in large quantity, a special shoe 196 may be provided, this shoe having a lower edge 198 as wide as the desired width of flange. The spacer shoe 196 is hung on the hangers, and operates to prevent movement of the flange past the guide so that only the fin is ground away.

The machine will accommodate molded pieces which depart somewhat from circular shape. This is illustrated in Fig. 18, in which the molded piece 200 has a rise 202. Such a rise is accommodated by yielding of the spring-pressed fingers and belt. Similar remark applies to the molded piece 204, shown in Fig. 19, this being octagonal in configuration. The corners of the octagonal piece are received by extra yielding of the belts and spring-pressed fingers.

The construction of the guide G is best shown in Fig. 7. It comprises a hardened steel plate 210, which is bolted to a holder 212 thereabove. Locating dowels 214 are preferably provided to accurately locate the guide relative to the wheel. It should be noted that the stationary rail 172 supports the molded piece slightly above the center line of the grinding wheel. In the machine illustrated, this displacement is a half-inch.

One advantage of this is that it provides a slight bevel at the ground edge or corner of the piece. Another advantage is that the guide G comes to an edge at a wider angle, which is stronger and more feasible structurally than would be the exceedingly thin knife-edge required at true tangency or center line. Another advantage is that fluctuations in the width of the ground edge will be less marked and less noticeable when working at an angle than when truly tangential. The guide G is only slightly longer than the grinding wheel, but is extended for work guiding purposes by a simple angle iron at each end of the machine, as is best shown at 216 in Figs. 1, 5 and 6.

After long use, the grinding wheel may have to be dressed or trued, and will then be slightly reduced in diameter. To compensate for this, the bearings may be moved by means best shown in Figs. 1, 5 and 6. In these figures, it will be seen that the main bearings 220 of the grinding wheel may be adjusted by means of screws 222. The bolts holding the bearings to the bed of the machine are first loosened and then after backing away the lock nuts on bolts 222, they may be advanced slightly and the bearings again tightened to the bed of the machine.

The grinding wheel is preferably driven at relatively high speed by a motor separate from the motor which moves the belts. For this purpose, the wheel shaft has a pulley 224 (Fig. 5) disposed over a rectangular opening 226 in the base of the machine through which a suitable V-belt (not shown) runs downwardly to a motor (also not shown) beneath the machine.

It is believed that the construction and operation of my improved machine for removing fin or flash from approximately circular molded pieces will be apparent from the foregoing detailed description. The machine is suitable for a custom molder working even with small job lots, for all adjustments of the machine may be made very rapidly. The work may be fed to the machine and removed from the machine by suitable conveyors or chutes, such chutes being indicated schematically in broken lines in Fig. 1.

The operator receiving a new piece simply adjusts the crank D to the new diameter, which is ordinarily supplied to the operator as a numerical figure on an operation sheet. The shoes are adjusted to the new height by actually putting a first specimen of the molded piece of the machine. If the piece needs a wide shoe instead of two narrow shoes, the operator readily pulls the narrow shoes out of the machine and drops a wide shoe into the machine. If the molded piece is a tall, cylindrical piece, the shoes are removed altogether, the weight of the piece being sufficient to hold it on the table. The hangers may be raised to topmost position, or if in the way even then, may be removed altogether, for they simply rest gravitationally on the piece projecting from the lower ends of the racks, as was described in connection with Fig. 2.

If the molded piece has no projections or inserts on the bottom, a number of intermediate guide rails may be dropped in position in the grooves of the table. If the piece has a bottom insert at the center, it may be possible to use the guide rails, or it may be necessary to remove one of them. If the piece has bottom projections spaced apart, the intermediate rails may be removed to permit rotation of the projections.

It will be understood that the work to be performed on the machine during the day may be so planned as to minimize changes in set-up. For example, all flat bottom pieces may be run one after another, and all pieces of like diameter, etc. Ordinarily, the only adjustment needed to accommodate a new piece is a rapid change in diameter by means of one crank, and a change in height by means of another.

One advantage of the machine is that the peripheral speed of the molded piece being finished is constant, because of the nature of the belt drive. Thus in changing from a small diameter piece to a large diameter piece, there is no sacrifice in time afforded to grind off the fin. The pieces move through the machine at half the speed of the belt. Small pieces are finished quicker than large pieces, the difference showing up primarily in that a large diameter piece will use the entire length of the grinding wheel, whereas a small diameter piece will have its circumference finished while making use of only the first part of the grinding wheel. It thereafter rolls idly along the guide without any real grinding action.

This is to be contrasted with any scheme in which the circular piece is mounted in a chuck and rotated, because in that case the speed of rotation would have to be substantially changed according to the diameter of the piece. In the present machine, this is automatically taken care of by the nature of the belt feed, for the rate of presentation of new fin to the grinding wheel is the same regardless of the diameter of the piece being finished.

The machine will accommodate not only circular pieces, but also pieces which are not truly circular as, for example, those shown in Figs. 18 and 19. The adjustment for change of molded piece may be made very rapidly. In most cases, the narrow shoes may be used, and it is only on rare occasions that the piece has a configuration such as to require a change to the wide shoe. It is not always necessary to use the shoes at all. The vertical adjustment of the shoes is automatically locked by means of a brake which is released by pressure on the handle when changing the adjustment.

It will be understood that while I have shown and described my invention in a preferred form, changes may be made in the structure disclosed without departing from the spirit of the invention as sought to be defined in the following claims.

I claim:

1. A machine for use by custom molders for removing fin or flash from approximately circular molded pieces which may differ very widely in diameter, comprising a relatively long cylindrical grinding wheel, a stationary table extending longitudinally of said wheel, said table being wide in order to support pieces of large diameter as well as pieces of small diameter, a belt above said table and spaced from said wheel to roll a molded piece along the wheel, pulley and shaft and bearing means to support the belt, said means being mounted at a level higher than the table and being devoid of downward obstructions and said table being devoid of upward obstructions which would in any way prevent said belt from being bodily shifted laterally over the width of said table toward said wheel to accommodate pieces of small diameter, a motor to drive the belt at any spacing from the wheel, and readily adjustable means to quickly change the spacing over a wide range between the pulley means and belt, on the one hand, and the wheel, on the other hand, said range corresponding substantially to the width of the table in order to accommodate molded pieces of widely different diameter.

2. A machine for use by custom molders for removing fin or flash from approximately circular molded pieces which may differ very widely in diameter, comprising a relatively long cylindrical grinding wheel, a stationary table extending longitudinally of said wheel, said table being wide in order to support pieces of large diameter as well as pieces of small diameter, a guide closely adjacent the wheel above the table with clearance therebetween to pass the fin or flash to the wheel, a belt above said table and spaced from said guide to roll a molded piece along the guide with the fin against the wheel, pulley and shaft and bearing means to support the belt, said means being mounted at a level higher than the table and being devoid of downward obstructions and said table being devoid of upward obstructions which would in any way prevent said belt from being bodily shifted laterally over the width of said table toward said guide to accommodate pieces of small diameter, a motor to drive the belt at any spacing from the guide, and readily adjustable means to quickly change the spacing over a wide range between the pulley means and belt, on the one hand, and the guide and wheel, on the other hand, said range corresponding substantially to the width of the table in order to accommodate molded pieces of widely different diameter.

3. A machine as defined in claim 1, in which the back of the belt is supported by a series of closely spaced spring-pressed fingers.

4. A machine as defined in claim 1, in which the back of the belt is supported by a series of closely spaced spring-pressed fingers, and having means in addition to said spring-pressed fingers to take up slack of the belt, said means including an idler pulley and means for urging the same against the outer or return side of the belt.

5. A machine as defined in claim 2, in which the back of the belt is supported by a series of closely spaced spring-pressed fingers.

6. A machine as defined in claim 2, in which the back of the belt is supported by a series of closely spaced spring-pressed fingers, and having means in addition to said spring-pressed fingers to take up slack of the belt, said means including an idler pulley and means for urging the same against the outer or return side of the belt.

7. A machine as defined in claim 1, having separate drive means for driving the grinding wheel at high speed and for driving the belt at relatively slow speed, and having means to vary the speed of the belt without affecting the speed of the grinding wheel.

8. A machine as defined in claim 2, having separate drive means for driving the grinding wheel at high speed and for driving the belt at relatively slow speed, and having means to vary the speed of the belt without affecting the speed of the grinding wheel.

9. A machine as defined in claim 1, having one or more shoes resting gravitationally on the molded pieces to hold the same downwardly.

10. A machine for removing fin or flash from approximately circular molded pieces, said machine comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, shoes resting gravitationally on the molded pieces to hold the same downwardly, there being one shoe at one side of the table adjacent the guide and another shoe at the other side of the table adjacent the belt, and motor and pulley means to move the belt.

11. A machine for removing fin or flash from approximately circular molded pieces, said machine comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, one or more shoes resting gravitationally on the molded pieces to hold the same downwardly, four vertically adjustable hangers supporting the shoe or shoes, means operable by a crank or handle for simultaneously raising or lowering all four hangers, and motor and pulley means to move the belt.

12. A machine for removing fin or flash from approximately circular molded pieces, said machine comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, shoes resting gravitationally on the molded pieces to hold the same downwardly, there being one shoe at one side of the table adjacent the guide, and another shoe at the other side of the table adjacent the belt, vertically adjustable hangers supporting the ends of the first shoe, vertically adjustable hangers supporting the ends of the second shoe, means operable by a crank or handle for simultaneously raising or lowering all four hangers, said shoes resting on and being readily removable from the hangers, and motor and pulley means to move the belt.

13. A machine for removing fin or flash from approximately circular molded pieces, said machine comprising a relatively long cylindrical grinding wheel, a table extending longitudinally of said wheel, a belt above said table and spaced from said wheel to roll a piece along the wheel, said table being provided with a rail at one edge near the wheel, a rail near the belt, the intermediate portion of said table being longitudinally grooved to readily detachably receive additional intermediate rails, and motor and pulley means to move the belt.

14. A machine for removing fin or flash from approximately circular molded pieces, said machine comprising a relatively long grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, a shoe bearing on the molded pieces to hold the same downwardly, vertically adjustable hangers supporting the shoe, means operable by a crank or handle for simultaneously raising or lowering the hangers, and motor and pulley means to move the belt.

15. A machine for removing fin or flash from approximately circular molded pieces, said machine comprising a relatively long grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, shoes bearing on the molded pieces to hold the same downwardly, there being one shoe at one side of the table adjacent the guide, and another shoe at the other side of the table adjacent the belt, vertically adjustable supports for the first shoe, vertically adjustable supports for the second shoe, means operable by a crank or handle for simultaneously raising or lowering all of the hangers, and motor and pulley means to move the belt.

16. A machine for removing fin and flash from approximately circular molded pieces which may differ widely in diameter, comprising a relatively long cylindrical grinding wheel, a table extending longitudinally of said wheel at one side of said wheel, said table being substantial in width and adapted to accommodate or support molded pieces of the maximum diameter to be treated, a belt having a feed side extending collaterally of the wheel at an elevation higher than the table, the feed side of said belt being disposed over the table and being adapted to roll a molded piece along the guide with the fin against the wheel, motor and pulley means to move the belt, said means being so disposed relative to the table as not to interfere with adjustment of the feed side of the belt transversely over the table to a position very close to the wheel, and readily adjustable means to quickly change the spacing between the feed side of the belt on the one hand, and the wheel on the other hand, in order to accommodate molded pieces of widely different diameter.

17. A machine for removing fin and flash from approximately circular molded pieces which may differ widely in diameter, comprising a relatively long cylindrical grinding wheel, a table extending longitudinally of said wheel at one side of said wheel, said table being substantial in width and adapted to accommodate or support molded pieces of the maximum diameter to be treated, a guide closely adjacent the wheel above the table with clearance therebetween to pass the fin or flash to the wheel, a belt having a feed side extending collaterally of the wheel at an elevation higher than the table, the feed side of said belt being disposed over the table and being adapted to roll a molded piece along the guide with the fin against the wheel, motor and pulley means to move the belt, said means being so disposed relative to the table as not to interfere with adjustment of the feed side of the belt transversely over the table to a position very close to the guide and wheel, and readily adjustable means to quickly change the spacing between the feed side of the belt on the one hand, and the guide or wheel on the other hand, in order to accommodate molded pieces of widely different diameter.

18. A machine as defined in claim 16 in which the readily adjustable means to quickly change the spacing includes a plurality of spaced parallel lead screws, a crank, and appropriate gearing connecting said crank to said screws for moving said screws in unison, and in which one or more rotatable micrometer scales or indicators are also connected to said crank and screws to indicate the change in spacing produced by rotation of said crank.

19. A machine as defined in claim 17 in which the readily adjustable means to quickly change the spacing includes a plurality of spaced parallel lead screws, a crank, and appropriate gearing connecting said crank to said screws for moving said screws in unison.

20. A machine for use by custom molders for removing fin or flash from approximately circular molded pieces which may differ very widely in diameter, comprising a relatively long cylindrical grinding wheel, a table extending longitudinally of said wheel, a belt above said table and spaced from said wheel to roll a molded piece along the wheel, motor and pulley means to move the belt, and readily adjustable means to quickly change the spacing over a very wide range between the pulley means and belt, on the one hand, and the wheel, on the other hand, in order to accommodate molded pieces of widely different diameter, said machine having a stationary base on which the grinding wheel is rotatably mounted, a head carried by columns slidable through the base, on which head the belt, pulley means, and driving motor are mounted, adjusting screws for moving the head toward or away from the base, means coupling said screws for simultaneous adjustment, and a crank or handle for turning the screws.

21. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said machine having a stationary base on which the grinding wheel is rotatably mounted, a head carried by columns slidable through the base, on which head the belt, pulley means, and driving motor are mounted, adjusting screws for moving the head toward or away from the base, means coupling said screws for simultaneous adjustment, and a crank or handle for turning the screws.

22. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said machine having a stationary base on which the grinding wheel is rotatably mounted, a head carried by columns slidable through the base, on which head the belt, pulley means, and driving motor are all mounted, adjusting screws for moving the head toward or away from the base, sprocket wheels on said screws, a chain connecting said wheels for simultaneous adjustment, a crank or handle for adjusting the screws, and indicating wheels to show the change in adjustment made by the screws.

23. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said machine having shoes resting gravitationally on the molded pieces to hold the same downwardly, there being one shoe at one side of the table adjacent the guide, and another shoe at the other side of the table adjacent the belt, the latter shoe being movable toward or away from the guide with the belt.

24. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said machine having shoes resting gravitationally on the molded pieces to hold the same downwardly, there being one shoe at one side of the table adjacent the guide, and another shoe at the other side of the table adjacent the belt, vertically adjustable hangers supporting the ends of the first shoe, vertically adjustable hangers supporting the ends of the second shoe, and means operable by a crank or handle for simultaneously raising or lowering all four hangers, said shoes resting on and being readily removable from the hangers, the second shoe and hangers being movable toward or away from the guide with the belt.

25. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said table being provided with a rail at one edge near the guide, a second rail near the belt, and the intermediate portion of said table being longitudinally grooved to readily detachably receive additional intermediate rails.

26. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said table being provided with a rail at one edge near the guide, there being a second rail near the belt, and means to move said second rail toward or away from the guide in unison with belt.

27. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said table being provided with a rail at one edge near the guide, a rail near the belt, and the intermediate portion of said table being longitudinally grooved to readily detachably receive additional intermediate rails, and means to move said second rail toward or away from the guide in unison with belt.

28. A machine for use by custom molders for removing fin or flash from approximately circular molded pieces which may differ very widely in diameter, comprising a relatively long cylindrical grinding wheel, a table extending longitudinally of said wheel, a belt above said table and spaced from said wheel to roll a molded piece along the wheel, motor and pulley means to move the belt, and readily adjustable means to quickly change the spacing over a very wide range between the pulley means and belt, on the one hand, and the wheel, on the other hand, in order to accommodate molded pieces of widely different diameter, said readily adjustable means to quickly change the spacing including a plurality of spaced parallel lead screws, a crank, and appropriate gearing connecting said crank to said screws for moving said screws in unison.

29. A machine for use by custom molders for removing fin or flash from approximately circular molded pieces which may differ very widely in diameter, comprising a relatively long cylindrical grinding wheel, a table extending longitudinally of said wheel, a belt above said table and spaced from said wheel to roll a molded piece along the wheel, motor and pulley means to move the belt, and readily adjustable means to quickly change the spacing over a very wide range between the pulley means and belt, on the one hand, and the wheel, on the other hand, in order to accommodate molded pieces of widely different diameter, said readily adjustable means to quickly change the spacing including a plurality of spaced parallel lead screws, a crank, and appropriate gearing connecting said crank to said screws for moving said screws in unison, and one or more rotatable micrometer scales or indicators being also connected to said crank and screws to indicate the change in spacing produced by rotation of said crank.

30. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said readily adjustable means to quickly change the spacing including a plurality of spaced parallel lead screws, a crank, and appropriate gearing connecting said crank to said screws for moving said screws in unison.

31. A machine for use by custom molders for removing fin or flash from approximately circular molded pieces which may differ very widely in diameter, comprising a relatively long cylindrical grinding wheel, a table extending longitudinally of said wheel, a guide closely adjacent the wheel above the table with clearance therebetween to pass the fin or flash to the wheel, a belt above said table and spaced from said guide to roll a molded piece along the guide with the fin against the wheel, motor and pulley means to move the belt, and readily adjustable means to quickly change the spacing over a very wide range between the pulley means and belt, on the one hand, and the guide and wheel, on the other hand, in order to accommodate molded pieces of widely different diameter, said readily adjustable means to quickly change the spacing including a plurality of spaced parallel lead screws, a crank, and appropriate gearing connecting said crank to said screws for moving said screws in unison, and one or more rotatable micrometer scales or indicators being also connected to said crank and screws to indicate the change in spacing produced by rotation of said crank.

RICHARD F. MAXFIELD.

REFERENCES CITED

The following references are of record in the file of this patent:

UNITED STATES PATENTS

| Number | Name | Date |
| --- | --- | --- |
| 319,735 | Loring et al. | June 9, 1885 |
| 1,205,314 | Adams | Nov. 21, 1916 |
| 2,263,897 | MaKenny | Nov. 25, 1941 |